United States Patent
Bychkov et al.

(10) Patent No.: US 7,930,585 B2
(45) Date of Patent: Apr. 19, 2011

(54) RECOVERY OF A FAILED FILE TRANSFER BETWEEN A HOST AND A DATA STORAGE DEVICE

(75) Inventors: Eyal Bychkov, Hod Hasharon (IL); Avraham Meir, Rishon Lezion (IL)

(73) Assignee: SanDisk IL Ltd, Kfar Saba (IL)

(*) Notice: Subject to any disclaimer, the term of this patent is extended or adjusted under 35 U.S.C. 154(b) by 495 days.

(21) Appl. No.: 11/968,668

(22) Filed: Jan. 3, 2008

(65) Prior Publication Data
US 2008/0168243 A1 Jul. 10, 2008

Related U.S. Application Data

(60) Provisional application No. 60/883,345, filed on Jan. 4, 2007.

(51) Int. Cl.
*G06F 12/16* (2006.01)
(52) U.S. Cl. ................... 714/6; 714/5; 714/42; 711/115
(58) Field of Classification Search ............... 714/5, 6
See application file for complete search history.

(56) References Cited

U.S. PATENT DOCUMENTS

| | | | |
|---|---|---|---|
| 5,504,883 A * | 4/1996 | Coverston et al. ............. | 1/1 |
| 6,385,707 B1 | 5/2002 | Maffezzoni | |
| 6,665,778 B1 | 12/2003 | Assaf | |
| 7,174,420 B2 | 2/2007 | Malueg et al. | |
| 7,299,314 B2 | 11/2007 | Lin et al. | |
| 2002/0087673 A1* | 7/2002 | Selkirk et al. ............. | 709/223 |
| 2002/0128994 A1* | 9/2002 | Sadhasivan et al. ............. | 707/1 |
| 2003/0041284 A1* | 2/2003 | Mambakkam et al. .......... | 714/15 |
| 2003/0093610 A1* | 5/2003 | Lai et al. ......................... | 711/103 |
| 2004/0078704 A1* | 4/2004 | Malueg et al. .................. | 714/42 |
| 2004/0080558 A1* | 4/2004 | Blumenau et al. ............. | 347/19 |
| 2004/0250172 A1 | 12/2004 | Patel et al. | |

(Continued)

FOREIGN PATENT DOCUMENTS

EP 0690380 1/1996

(Continued)

OTHER PUBLICATIONS

Seung-Ho Lim, Kyu-Ho Park, An Efficient NAND Flash File System for Flash Memory Storage, IEEE Transactions on Computers, v. 55, n. 7, p. 906-912, Jul. 2006.*

*Primary Examiner* — Scott T Baderman
*Assistant Examiner* — Chae Ko
(74) *Attorney, Agent, or Firm* — Martine Penilla & Gencarella, LLP

(57) ABSTRACT

Embodiments of the present invention relate to an apparatus, method and computer readable medium for recovering from a failed or aborted outgoing data transfer operation from a host device to a peripheral storage device. In some embodiments, before the peripheral storage device is corrupted by the failed outgoing data transfer operation, one or more recovery data objects are stored on the host-side. After the peripheral storage device is corrupted by the failed data transfer, the host device responds to a subsequent coupling with the peripheral storage device by repairing the corrupted peripheral storage device using one or more of the host-side stored recovery data objects. Optionally, the host device also restores the outgoing aborted or failed data transfer operation.

27 Claims, 8 Drawing Sheets

U.S. PATENT DOCUMENTS

| | | | | |
|---|---|---|---|---|
| 2004/0267801 A1* | 12/2004 | Dunsmore et al. | ............ | 707/102 |
| 2005/0015415 A1* | 1/2005 | Garimella et al. | ............ | 707/204 |
| 2005/0078823 A1* | 4/2005 | Usui et al. | ............ | 380/201 |
| 2006/0112224 A1* | 5/2006 | Kwon et al. | ............ | 711/115 |
| 2006/0139807 A1* | 6/2006 | Shimotono et al. | ............ | 360/137 |
| 2007/0016721 A1* | 1/2007 | Gay | ............ | 711/103 |
| 2007/0032228 A1 | 2/2007 | Varanda | | |
| 2007/0086244 A1* | 4/2007 | Zilberman | ............ | 365/185.09 |
| 2007/0136548 A1* | 6/2007 | Mane | ............ | 711/170 |
| 2007/0266221 A1* | 11/2007 | Kagatsume et al. | ............ | 711/205 |
| 2007/0300008 A1* | 12/2007 | Rogers et al. | ............ | 711/103 |
| 2008/0104144 A1* | 5/2008 | Rajan | ............ | 707/204 |

FOREIGN PATENT DOCUMENTS

WO      WO 02/50829      6/2002

* cited by examiner

RECOVERY OF A FAILED FILE TRANSFER BETWEEN A HOST AND A DATA STORAGE DEVICE

CROSS-REFERENCE TO RELATED APPLICATIONS

This patent application claims the benefit of U.S. Provisional Patent Application No. 60/883,345, filed Jan. 4, 2007 by the present inventors.

FIELD OF THE INVENTION

The present invention relates to methods, apparatus and computer readable medium for recovering from a failed file transfer between a host and a data storage device.

BACKGROUND AND RELATED ART

"Peripheral storage devices" are well-known in the art of computing, in form factors such as USB flash drives (UFD); PC-cards; and small storage cards used with digital cameras, music players, handheld and palmtop computers, and cellular telephones. Peripheral storage devices also include portable magnetic disks and portable digital appliances (music players and cellular telephones) that double as general-purpose storage devices.

The process of data transfer (i.e. of one or more data objects) between the host and the peripheral storage device should not be interrupted before it is completed.

Many UFD devices provide a visual indication upon completion of any given data transfer operation. For example, certain UFD devices include a light which flashes upon completion of a given data transfer operation.

It often happens that a data transfer operation fails, for example, due to a premature disconnection of the peripheral storage device from the host device or due to a power failure or due to buffer overflow.

When such an event occurs, there is a risk of damage to locally-stored stored "storage-system data structures" residing on the "target" peripheral storage device that is targeted by the failed file transfer. Examples of such "at-risk" storage-system data structures include but are not limited to file system table(s) (for example, FAT32 tables), directory tree data structures, and flash mapping tables, each of which can reside "locally" on the "target" peripheral storage device. Unfortunately, such damage is liable to corrupt the storage device and thus render the device unusable to the average user.

FIG. 1 is a block diagram of a system in which a failure of a data transfer operation may occur. In the example of FIG. 1, host device 10 (for example, a personal computer, PDA, or cell phone) is coupled to the "target" peripheral storage device 50 (for example, a flash storage device such as a UFD or a flash memory card such as an MMC or SD card) via a communications link 15 between host-side interface 20 and device-side interface 55 (for example, respective USB or SD interfaces). Typically, the storage of a peripheral storage device is divided into two storage regions (i.e. physical or logical locations)—a user-data storage region 60 where user data (for example, one or more files or other data objects) is stored and a system data storage region 70 where system data is stored.

Typically, the storage-system data stored on the peripheral storage device 50 is organized into various data structures 75A-B (the number of which may vary from that shown in FIG. 1)—for example, file system tables such as a FAT32 tables or data structure(s) describing a directory tree or flash mapping table(s) or any other data structure. For convenience, storage system data structures 75A-B may be referred to more generally as storage system data structures 75.

In the normal course of operation, one or more of the storage system data structures 75 may be modified, for example, by the controller (not shown) of target storage device 50, whenever user data is written to or erased from target storage device 50.

As shown in FIG. 1, an attempt 5 is made to copy or move data (for example, one or more files or other data objects) from host device 10 to target peripheral storage device 50—the attempt to transfer data from host device 10 to storage device 50 is referred to as an attempted "outgoing" inter-device data transfer from host device 10 to storage device 50.

In the example of FIG. 1, the inter-device data transfer operation is managed, on the host side, by data-transfer manager 25, for example, storage-system code (e.g. of a file-oriented storage system or object oriented storage system) which, when executed (for example by microprocessor 89), is operative to effect the outgoing data transfer operation. In one particular example, data-transfer manager 25 is provided as an operating system component.

In one example, a single file is copied from the host device 10 to the storage device 50. In this case, not only is the data of the copied file written to the user data region 60, but the various data structures in the system data region 70 must be updated—for example, the directory data structure must be updated to reflect the presence of the "new" file, the FAT tables must be updated, and the flash management tables must be updated.

If the data transfer operation is unexpectedly aborted (e.g. due to a premature device detachment or power failure or buffer overflow or any other cause) when updating one or more storage system data structures 75' there is a risk of corruption of one or more of the "partially modified" storage system data structures 75.

There are different scenarios where it is not required to re-write all system data in the system data region 70 during the data transfer operation, but rather only a particular portion of the system data. In one scenario, there are multiple copies of a particular table (for example, multiple copies of a FAT32 table—not necessarily identical) residing on the target storage device 50, and a given file transfer operation only modifies one or some of these multiple tables without modifying others. In another scenario, only a certain portion of a storage-system data structure (for example, only a portion of a file system table) is modified, while the rest of the storage-system data structure is left un-modified. In yet another scenario, multiple redundant copies (for example, including "older" versions and "newer" versions) of the same storage system table reside on the storage device 50.

In the example of FIG. 1, some storage system data structures (i.e. storage system data structure 75A) are modified by the outgoing data transfer 5, while others (i.e. storage data structure 75B) are not. This modification of a data structure is illustrated in the figure by the asterisk notation.

For the present disclosure, regions of the system data region 70 that are not modified during a given inter-device data transfer operation are referred to as "clean locations" on the storage device 50. Thus, the region where system data structure 75B resides is one example of "clean location" on the storage device 50.

It is appreciated that in some data transfer operations, some portions of a particular data structure may be modified, while other portions are left unmodified. The regions in which these "unmodified" portions reside are another example of a "clean location" on storage device 50 that is not modified by the inter-device data transfer operation.

SUMMARY OF THE INVENTION

It is now disclosed for the first time a method of recovering from an aborted outgoing inter-device data-transfer operation from a host device to a target peripheral storage device which corrupts the target peripheral storage device, the method comprising: a) prior to the corrupting of the target peripheral storage device and in response to a request to commence the data-transfer operation, storing, on a host side, at least one recovery data object selected from the group consisting of: i) system data of a peripheral-device-residing storage-system data structure which is subsequently corrupted by the aborted data-transfer operation; and ii) a handle to a clean location on the peripheral storage device which is not subsequently overwritten by the aborted outgoing data-transfer operation and where the system data resides; and b) in response to a subsequent coupling between the host device and the peripheral storage device that occurs after the peripheral storage device is corrupted by the aborted outgoing data-transfer operation, repairing the corrupted peripheral storage device using the host-side stored at least one recovery data object.

According to some embodiments, the peripheral-device-residing storage-system data structure describes a directory tree of the peripheral storage device.

According to some embodiments, the peripheral-device-residing storage-system data structure is a file system table of the peripheral storage device.

According to some embodiments, the peripheral-device-residing storage-system data structure is a flash mapping table of the peripheral storage device.

According to some embodiments, the method further comprises: c) prior to the corrupting of the target peripheral storage device by the aborted outgoing inter-device data-transfer operation, and in response to the request to commence the data-transfer operation, storing, on the host side, at least one of: i) a description of one or more identifiers of one or more data objects of the data-transfer operation; and ii) peripheral storage device target location data of the inter-device data-transfer operation; and d) after the corrupting data-transfer operation, in response to the subsequent coupling between the host device and the peripheral storage device, restoring the aborted outgoing inter-device data-transfer operation, using at least one of the description of c(i) and the target location data of c(ii).

According to some embodiments, the target location data includes directory path data.

According to some embodiments, i) the at least one recovery data object is stored in a host-side indexed recovery data structure where a plurality of recovery data objects are indexed in accordance with peripheral storage device identifiers; and ii) the method further comprises: c) after the peripheral storage device is corrupted by the aborted data-transfer operation, i) in response to the subsequent coupling between the host device and the peripheral storage device, detecting a device identifier of the peripheral storage device; and ii) retrieving the at least one recovery data object, of the target device, from the host-side indexed recovery data structure using the detected device identifier of the peripheral storage device as an index.

According to some embodiments, i) the method further comprises: c) in response to the subsequent coupling between the host device and the peripheral storage device, soliciting a user approval to repair the corrupted peripheral storage device, and ii) wherein the repairing of the corrupted peripheral storage device of step (b) is contingent upon receiving the user approval in response to the user approval-soliciting.

According to some embodiments, the repairing of step (b) is carried out without any user input.

It is now disclosed for the first time a host device comprising: a) a device interface for coupling with a peripheral device b) a data-transfer manager for managing inter-device data-transfer operations via the device interface; c) a recovery-data archiver, operative: i) before an aborted outgoing inter-device data-transfer operation: A) with a target peripheral device that is coupled to the host device via the device interface, and B) which subsequently corrupts the coupled target peripheral device; and ii) in response to a request to commence the outgoing inter-device data-transfer operation, to store, on a host side of the device interface, at least one recovery data object selected from the group consisting of: iii) system data of a peripheral-device-residing storage-system data structure which is subsequently corrupted by the aborted data-transfer operation; and iv) a handle to a clean location on the peripheral storage device which is not subsequently overwritten by the aborted data-transfer operation and where the system data resides; and d) a peripheral device repairer, operative, in response to a subsequent coupling between the host device and the peripheral storage device that occurs after the peripheral storage device is corrupted by the aborted outgoing data-transfer operation, to repair the corrupted target peripheral storage device using the host-side stored at least one recovery data object.

According to some embodiments, the system data structure describes a directory tree of the peripheral storage device.

According to some embodiments, the system data structure is a file system table data structure of the peripheral storage device.

According to some embodiments, the system data structure is a flash management table data structure of the peripheral storage device.

According to some embodiments, the host device further comprises: e) a data-transaction data-archiver operative, prior to the corrupting of the target peripheral storage device by the aborted outgoing inter-device data-transfer operation, and in response to the request to commence the data-transfer operation, to store, on the host side of the device interface, at least one of: i) a description of one or more identifiers of one or more data objects of the data-transfer operation; and ii) peripheral storage device target location data of the inter-device data-transfer operation; and f) a data-transaction restorer operative: i) after the corrupting data-transfer operation; and ii) in response to the subsequent coupling between the host device and the peripheral storage device, to restore the aborted outgoing inter-device data-transfer operation, using the description of e(i) and the target location data of e(ii).

According to some embodiments, the target location data includes directory path data.

According to some embodiments, i) the host device further comprises: e) a peripheral device identifier-detector operative to detect an identifier of the coupled target peripheral device coupled via the device interface; ii) the recovery-data archiver is operative, in accordance with the identifier of the coupled target peripheral device received from the peripheral device identifier-detector, to store the at least one recovery data object in a host-side indexed recovery data structure where a plurality of recovery data objects are indexed in accordance with peripheral storage device identifiers; and iii) the host device further comprises: f) a recovery-data retriever operative, in response to the subsequent coupling between the host device and the peripheral storage device, to retrieve the at least one recovery data object, for the target peripheral device, from the host-side indexed recovery data structure, using the identifier of the coupled target peripheral device as an index.

According to some embodiments, i) the host device further comprises: f) a user interface operative, in response to the subsequent coupling between the host device and the peripheral storage device, to: A) present, to a user, a request for user approval to repair the corrupted peripheral storage device, and B) receive a response to the presented request; and ii) wherein the peripheral device repairer is operative to effect the repairing of the corrupted target peripheral storage device in a manner that is contingent upon receiving a positive the response to the presented request. According to some embodiments, the peripheral device repairer is operative to effect the repairing of the target peripheral storage device in a manner that is independent of any received user input.

It is now disclosed for the first time a computer readable medium having stored thereon computer readable program code for causing a host computer device to recover from an aborted outgoing inter-device data-transfer operation from the host computer device to a target peripheral storage device which corrupts the target peripheral storage device, the program code being operable to cause the processor to: a) prior to the corrupting of the target peripheral storage device and in response to a request to commence the data-transfer operation, storing, on a host side, at least one recovery data object selected from the group consisting of: i) system data of a peripheral-device-residing storage-system data structure which is subsequently corrupted by the aborted data-transfer operation; and ii) a handle to a clean location on the peripheral storage device which is not subsequently overwritten by the aborted outgoing data-transfer operation and where the system data resides; and b) in response to a subsequent coupling between the host device and the peripheral storage device that occurs after the peripheral storage device is corrupted by the aborted outgoing data-transfer operation, repairing the corrupted peripheral storage device using the host-side stored at least one recovery data object.

According to some embodiments, the peripheral-device-residing storage-system data structure describes a directory tree of the peripheral storage device.

According to some embodiments, the peripheral-device-residing storage-system data structure is a file system table of the peripheral storage device.

According to some embodiments, the peripheral-device-residing storage-system data structure is a flash mapping table of the peripheral storage device.

According to some embodiments, the program code is further operable to cause the processor to: c) prior to the corrupting of the target peripheral storage device by the aborted outgoing inter-device data-transfer operation, and in response to the request to commence the data-transfer operation, storing, on the host side, at least one of: i) a description of one or more identifiers of one or more data objects of the data-transfer operation; and ii) peripheral storage device target location data of the inter-device data-transfer operation; and d) after the corrupting data-transfer operation, in response to the subsequent coupling between the host device and the peripheral storage device, restoring the aborted outgoing inter-device data-transfer operation, using at least one of the description of c(i) and the target location data of c(ii).

According to some embodiments, the target location data includes directory path data.

According to some embodiments, i) the program code is operable such that the at least one recovery data object is stored in a host-side indexed recovery data structure where a plurality of recovery data objects are indexed in accordance with peripheral storage device identifiers; and ii) the program code is further operable to cause the processor to: c) after the peripheral storage device is corrupted by the aborted data-transfer operation, i) in response to the subsequent coupling between the host device and the peripheral storage device, detecting a device identifier of the peripheral storage device; and ii) retrieving the at least one recovery data object, of the target device, from the host-side indexed recovery data structure using the detected device identifier of the peripheral storage device as an index.

According to some embodiments, i) the program code is further operable to cause the processor to: c) in response to the subsequent coupling between the host device and the peripheral storage device, soliciting a user approval to repair the corrupted peripheral storage device, and ii) wherein the program code is operable such that the repairing of the corrupted peripheral storage device of step (b) is contingent upon receiving the user approval in response to the user approval-soliciting.

According to some embodiments, the program code is operable such that, upon execution by the processor, the repairing of step (b) is carried out without any user input.

It is noted that features described above as pertaining to certain embodiments may also be included in other embodiments, unless indicated to the contrary hereinbelow.

DETAILED DESCRIPTION OF EMBODIMENTS

Figure 1:
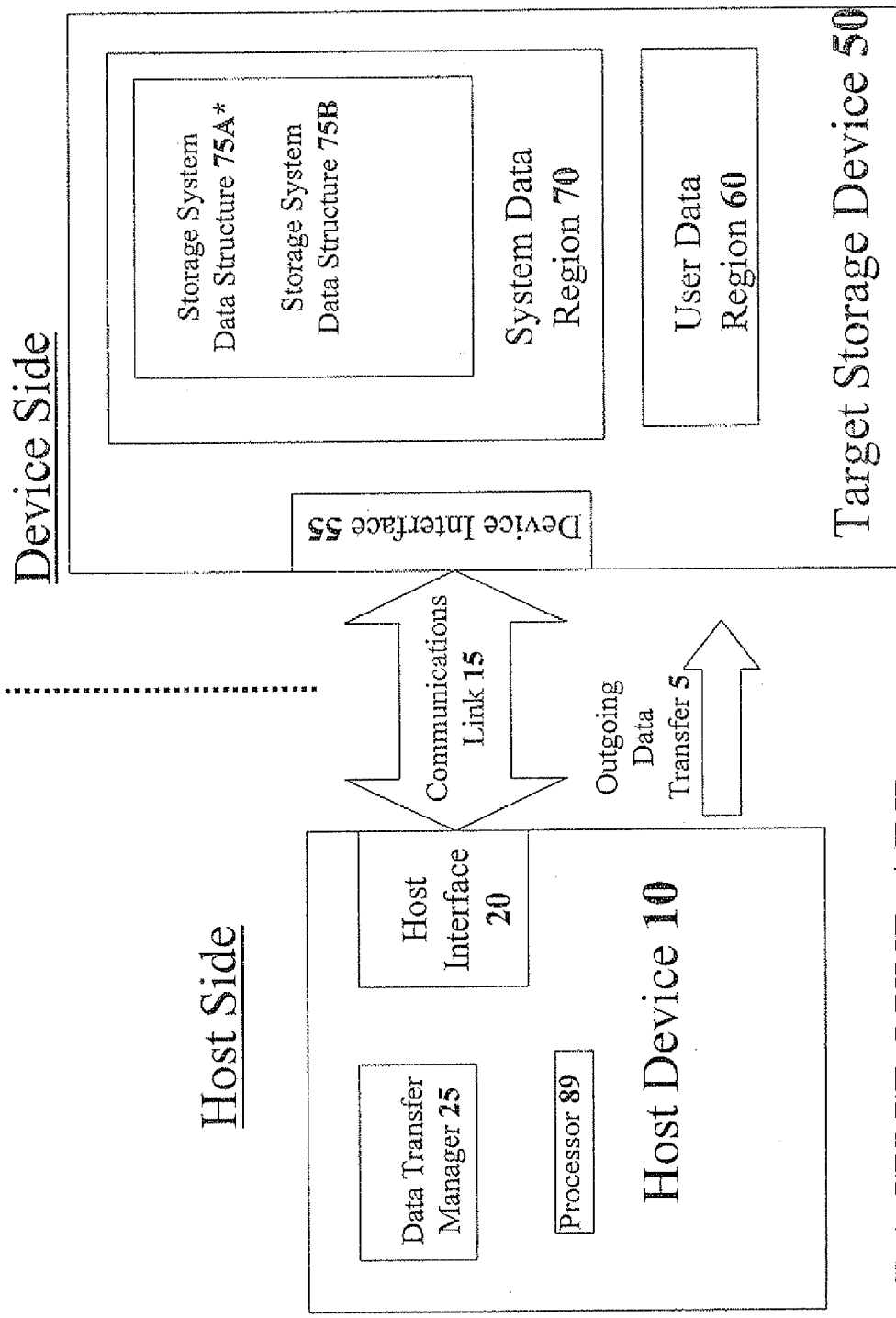
FIG. 1 is a block diagram of an exemplary system according to the background art.

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code, for recovering from failed or aborted outgoing inter-device data-transfer operations is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e. meaning "having the potential to"), rather than the mandatory sense (i.e. meaning "must").

Embodiments of the present invention relate to an apparatus, method and computer readable medium for recovering from a failed or aborted outgoing data transfer operation from a host device to a peripheral storage device. In some embodiments, before the peripheral storage device is corrupted by the failed outgoing data transfer operation, one or more recovery data objects are stored on the host-side. After the peripheral storage device is corrupted by the failed data transfer, the host device responds to a subsequent coupling with the peripheral storage device by repairing the corrupted peripheral storage device using one or more of the host-side stored recovery data objects. Optionally, the host device also restores the outgoing aborted or failed data transfer operation in response to the subsequent coupling.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A "peripheral storage device" refers to a device having a device housing and a "contact" or contactless device interface via which the peripheral storage device may "couple" to a host device and exchange data with the host device. In one non-limiting example, the peripheral storage device is reversibly attachable to a port (i.e. plug or socket) of the housing of the host device or reversibly attachable via some sort of mediating external cable or external cradle.

Peripheral storage devices communicate with their hosts using a 'master-slave' communications protocol that has a 'host side' and a 'peripheral side.' Examples of "master-slave" protocols include but are not limited to Universal Serial Bus (USB) protocols, MultiMediaCard (MMC) protocols, and Secure Digital (SD) protocols.

When a 'host' and a 'peripheral storage device' are 'coupled': (i) they are in communication with each other via a 'point-to-point' data link (either a 'wired connection' or a short-range wireless link without any requirement for an intermediate routing device) so that data may flow via the 'point-to-point' data link between the host and peripheral; and (ii) they are configured to communicate using a 'master-slave' protocol—i.e. the host is configured to communicate with the peripheral storage device in the 'host' or master role defined by the protocol and the peripheral storage device is configured to communicate with the host in the 'slave' or peripheral role defined by the protocol.

An "inter-device outgoing data-transfer operation" from a host device to a peripheral storage device refers to the copying or moving of one or more "target" "data objects" from a host device (for example, a laptop, a desktop, a cellphone, a personal digital assistant (PDA), etc) to a peripheral storage device, specifically to a specified "target" location (physical or logical) or set of locations on the peripheral storage device. In one non-limiting example, the "target" "data objects" are computer files. Other examples of target data objects include but are not limited to computer records, folders, address books (or portions thereof), and digital media objects (for example, movies, music albums, images, etc). The "target" location may be specified as a folder, directory (for example, within a directory tree), sector, block or in any other manner known in the art.

One non-limiting example of an "inter-device data-transfer" operation is a file transfer operation of one or more files between the host device and the peripheral storage device. Another non-limiting example of an "inter-device data-transfer" is a transfer of one or more data object(s) between the host device and the peripheral storage device using a so-called object oriented storage protocol, including but not limited to the Media Transfer Protocol (MTP).

An "outgoing" inter-device data-transfer operation from a host to a peripheral storage device refers to a data-transfer operation where one or more data object(s) (including but not limited to files) are moved to or copied to the peripheral storage device from the host device. For convenience, the term "outgoing" may also be used by itself to indicate the direction of an inter-device data-transfer operation, namely, as going from the host device to the peripheral storage device.

It is understood that a host device may be coupled to one or more peripheral storage devices at a given time. The "target" or "destination" peripheral device of any given data-transfer operation is the peripheral device to which any attempt is made to copy or transfer one or more data object(s).

Figure 2A:
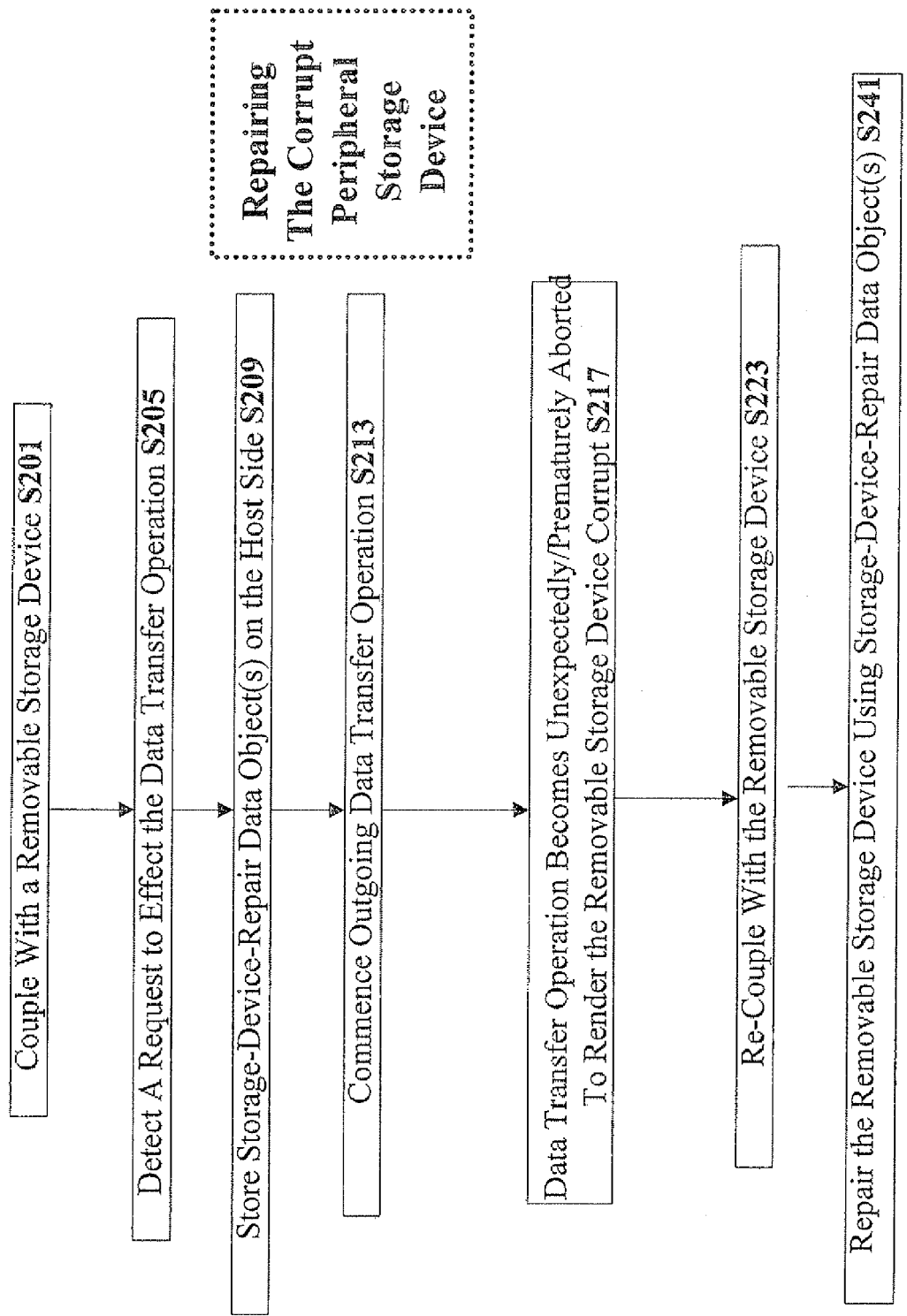
FIGS. 2A, 3 and 4 are flow charts of routines for recovery from a failed data transfer operation according to some example embodiments.
Figure 2B:
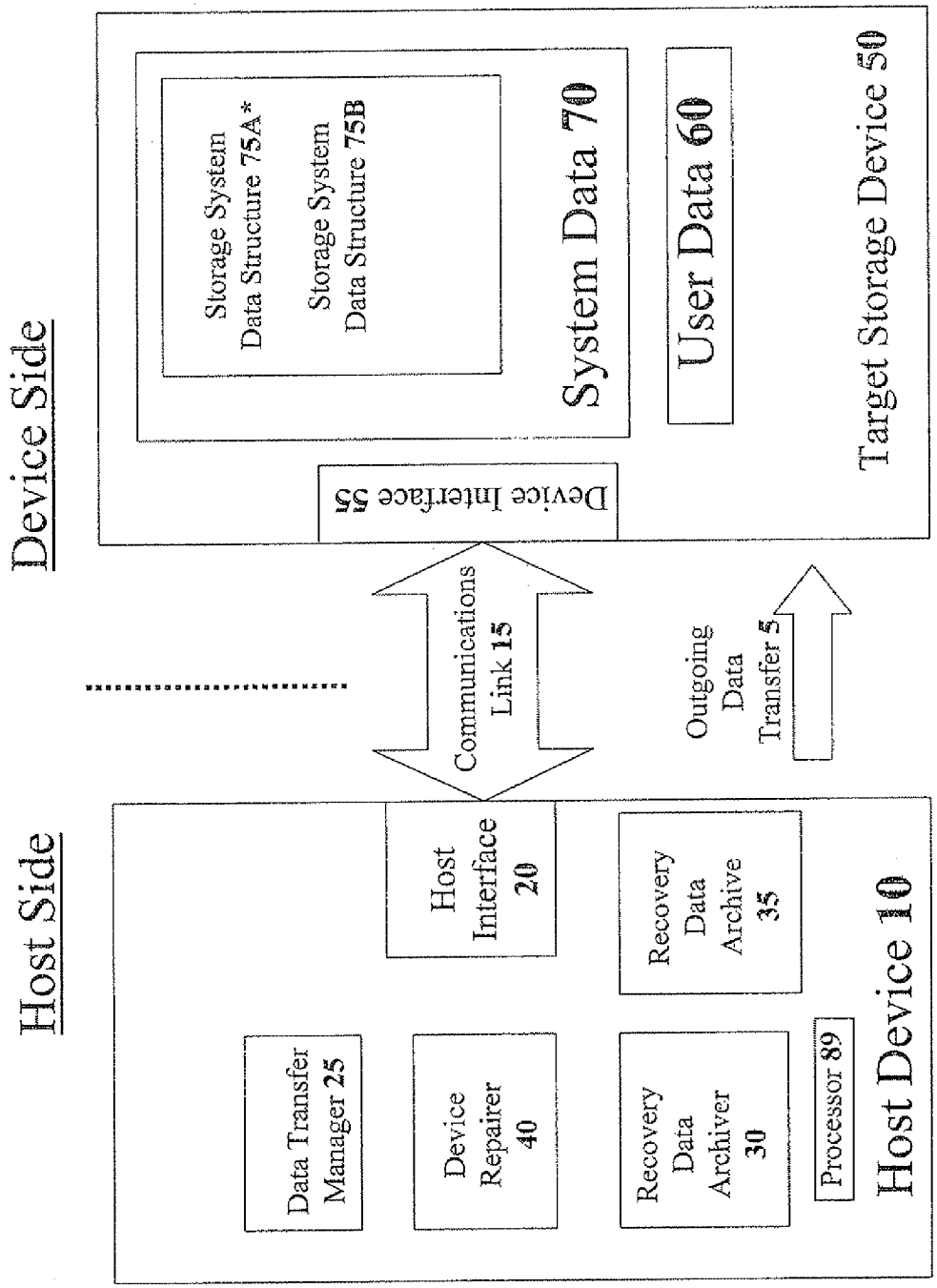
FIGS. 2B and 5A-5C are block diagrams of exemplary system configurations for recovery from a failed data transfer operation according to some example embodiments.

A Discussion of FIGS. 2A-2B: Introduction

FIG. 2A is flow chart describing an exemplary technique for handling a failed or aborted outgoing inter-device data transfer operation according to some example embodiments. It is noted the order of the steps in FIG. 2A is just illustrative, and embodiments where the steps are performed in other orders are also contemplated by the present inventors. This is true not only for FIG. 2A, but for any other figure describing a flow chart of a routine (for example, FIG. 3, and FIG. 4).

The routine described in FIG. 2A may be carried out, for example, in the system described in the block diagram of FIG. 2B. It is noted that any element appearing in currently-discussed block diagram FIG. 2B (or in the block diagrams of FIGS. 5A-5C discussed below), for example, data transfer manager 25, device repairer 40, device interface 20, and recovery data archiver 30 may be implemented in any combination of hardware, firmware and/or software. In some embodiments, the software is executable by processor 89.

Thus, referring to the technique of FIG. 2A, in step S201, host device 10 is coupled with removable storage device 50. Subsequently, host device 10 detects, in step S205, a request to effect a data transfer operation—for example, to copy one or more files to the "target" storage device 50 via inter-device communications link 15. The request may come from any source, for example, a mouse and/or keyboard connected to host device 10 or from any other source.

A Discussion of FIGS. 2A-2B: A Discussion of Recovery Data Objects

In step S209, in response to the detected request to effect the data transfer operation, one or more recovery data object(s) are stored on the host side. The one or more recovery data object(s) are used later, in step S241, to repair the peripheral storage device after the peripheral storage device is corrupted in step S217. The recovery data object(s) will now be described in more detail.

In one non-limiting example, one or more data storage system data structures (or a portion thereof) residing on target peripheral storage device 50 are "mirrored" on the host-side—for example, stored in a volatile or non-volatile memory of host device 10 or in any other location of the host device. Thus, in this example, before commencing the outgoing data transfer operation in step S213, a "backup" of storage-system data that could be potentially damaged by the outgoing data transfer operation is made on the host side.

In yet another example, rather than mirroring storage-system data, it is sufficient to store, on the host side, a "handle" or description of a "clean location on the peripheral storage device." This "handle" describes a "clean" physical or logical location in the system data region 70 of peripheral storage device 50.

One non-limiting example of a "handle" is a physical or logical address. Another non-limiting example of a "handle" is an identifier of a peripheral-device-residing data object, where the object is associated with or resides in a particular location in the system data region 70 of peripheral storage device 50.

Thus, in one non-limiting example, two copies of a file access table (FAT table) reside in the system data region 70

(i.e. logical or physical region) of target storage device 50—a "first" copy and a "second" copy. In this example, only a first copy of the FAT table (i.e. "copy A") is modifiable and thus corruptible by the outgoing data transfer operation, while it is known that the second copy of the FAT table is not modified and/or overwritten during the file transfer operation. Thus, the region in which the second copy of the FAT table resides (i.e. either logical or physical region) is an example of a "clean location." In this non-limiting example, it is possible to store on the host side a "handle" to this clean location—this "handle" may be as simple as the object identifier "copy B," or may be an address (for example, by a list of block(s) in which "copy B" resides or any other way of specifying a physical or logical address), or any other description of "copy B" and/or the location in which copy B resides.

It is noted that the previous examples are provided to indicate the "minimum data" needed for subsequent repairing of the peripheral storage device in step S241. It is appreciated that in some embodiments, more than this minimum data can be stored on the host side in step S209 and used later in step S241 when the peripheral storage device is repaired.

In one example, peripheral-storage-device-residing storage-system tables or sections of storage-system tables that are not modified in the subsequent data-transfer operation are also copied to the host side before connecting the outgoing data transfer operation.

Thus, it is appreciated that there is no requirement for the host device to explicitly determine in advance which storage-system data will be modified by the subsequent outgoing data transfer operation. However, in some embodiments, it may be advantageous for the host side to make such a determination in advance. In certain situations, this may be useful, for example, for minimizing the amount of storage-system data peripheral device 50 needs to copy to the host side.

In one non-limiting example, the storing of the one or more recovery data object(s) in step S209 may be carried out by recovery data archiver 30 of FIG. 2B, which may be provided, for example, as a software agent that is executed by a processor of the host device It is noted that the one or more recovery data object(s), stored in step S209, may be stored in any location on the host device or any other location on the "host side"—this location is referred to as the "recovery data archive 35." Thus, although recovery data archive 35 is shown in FIG. 2B as being on host device 10, recovery data archive 35 can be separate from host device 10. Recovery data archive 35 may be implemented in any combination of volatile memory (for example, RAM) of host device 10 and/or non-volatile memory—for example, in a non-volatile memory device other than target storage device 50. In the example where recovery data archive 35 resides on a non-volatile memory device other than target storage device 50, the host device may be coupled with this "other non-volatile memory device" (not shown) on which recovery data archive 35 resides via a different device interface (not shown), i.e. via a host-side interface other than host-side interface 20. Nevertheless, it is understood that this "other non-volatile memory device" (not shown), resides, in its entirety, on the "host side" of communications link 15 between host 10 and target storage device 50.

A Discussion of Step S213-S241

In step S213, the outgoing data transfer operation commences. This outgoing data transfer operation becomes unexpectedly/prematurely aborted, in step S217, in a manner that renders peripheral storage device 50 corrupt.

It is noted that the aborted file transfer operation also may serve to "decouple" or "uncouple" the peripheral storage device from the host device so that, for at least some period of time, the peripheral storage device is unable to exchange data with the host device. This may be due, for example, to a power failure or a detachment of the peripheral storage device from its host-side port or a buffer overflow.

Subsequent to the corrupting of peripheral storage device (in step S217), the peripheral storage device is re-coupled with the host device in step S223. At this point, the corrupted peripheral storage device 50 may, once again, communicate with host device 10.

In step S241, in response to a detection of the re-coupling, host device 10 acts to repair the peripheral storage device. In one example, this may be carried out by device repairer 40, which may be provided, for example, as a software agent that is executed by a processor of host device 10.

In step S241, the one or more host-side-stored recovery data object(s) are retrieved from volatile and/or non-volatile memory on the host-side. In some embodiments, the one or more recovery data object(s) are retrieved from recovery data archive 35.

After the one or more recovery data object(s) are retrieved, the one or more recovery data object(s) are used to repair peripheral storage device. In one example, a storage system data structure 75 or a portion thereof which was copied to the host-side in step S209 is copied back to the peripheral storage device 50 to repair the device.

In another example, the handle to the clean location on the peripheral device 50 is used to retrieve an "uncorrupted" copy or version of the corrupted data in the clean location on the peripheral device 50. This retrieved data may then be used to repair the peripheral storage device 50. In one example, one or more corrupted storage system data structures 75 is repaired using the retrieved data. In another non-limiting example, the corrupted storage system data structure 75A* (the asterisk in FIG. 2B representing the corruption) is marked on peripheral storage device 50 as "unusable" and a "pointer" to the corrupt data structure is replaced, in the system data region 70 of peripheral storage device 50, with a "pointer" to an uncorrupted data structure (for example, 75B).

In one particular non-limiting example, storage-system data stored in region 70 of target storage device 50 representing the state of the peripheral storage device 50 before the commencement of outgoing data transfer operation S213 is retained. This allows for the "undoing of damage" inflicted by the aborted data transfer operation.

Figure 3:
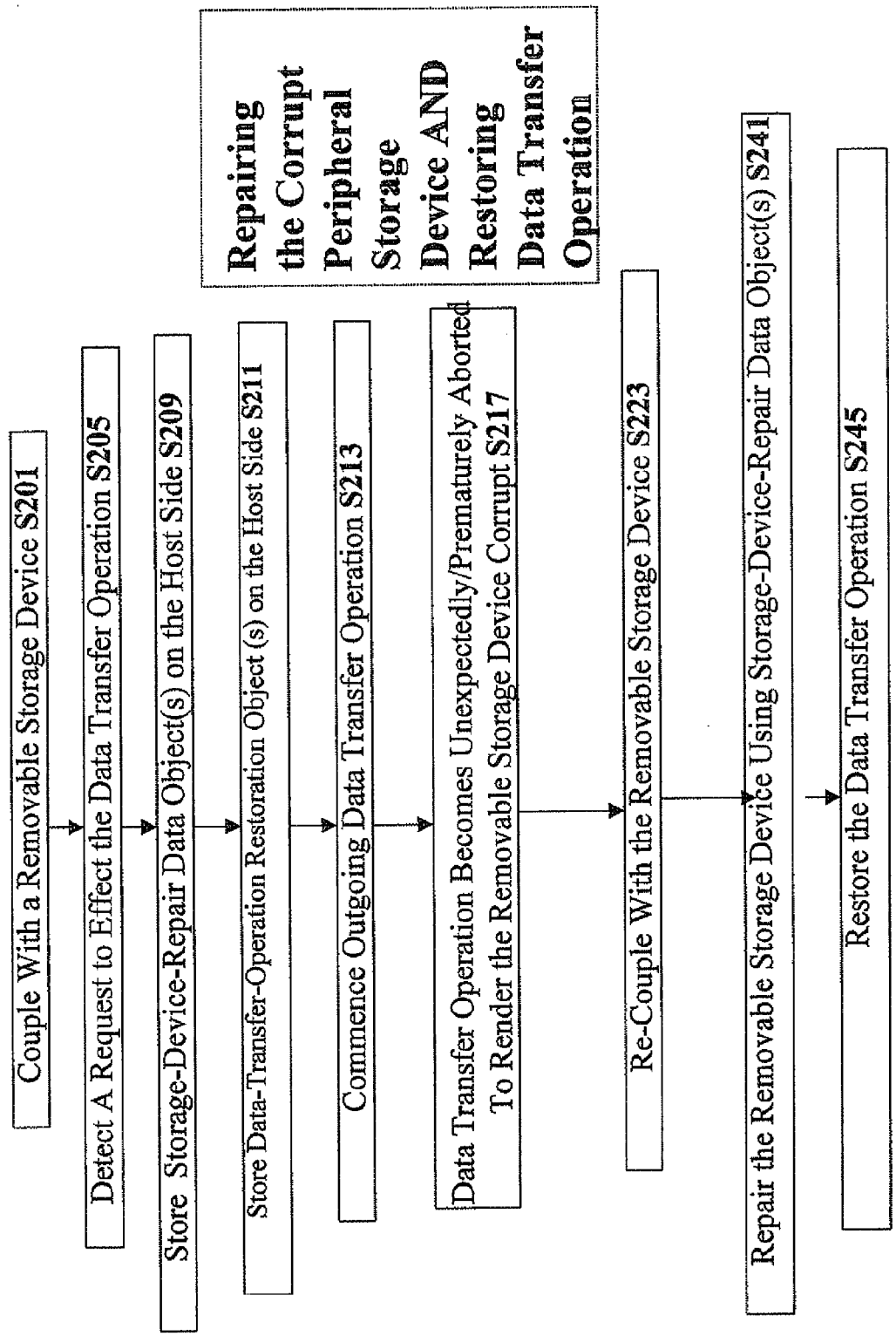

A Discussion of "Restoring" the Data Transfer Operation and of FIG. 3

For the present disclosure, "restoring the data transfer operation" refers to taking action, by the host device, after re-coupling with peripheral storage device 50 in step S213, such that the "target" data object(s) specified by the outgoing data transfer operation (i.e. which is attempted in step S213) are copied and/or moved to the "target location(s)" on the peripheral storage device 50.

Thus, for any data object that is partially transferred (i.e. moved or copied) to the target peripheral device, "restoring the data transfer operation" may include, for example, re-transferring the partially transferred data object to the target location(s) on the peripheral storage device 50.

In some examples, one or more data object(s) specified by the data transfer operation may not be transferred even partially to the peripheral storage device 50 during the attempted data transfer operation that is aborted or failed. In one use case, the aborted data transfer operation attempts to write one or more data object(s) to target storage device 50. In this example, (i) one or more data objects may be "successfully" written to target storage device 50 in whole, (ii) one or more data objects may be "partially" written to target storage device 50, and (iii) one or more data objects may not be written even partially to target peripheral storage device 50. In this example, restoring the data transfer operation would thus include: (i)' for each "successfully" written data object, either doing nothing or re-writing the data object to the peripheral storage device 50; (ii)' for each "partially" transferred data object, either re-writing the data object "from scratch" or "completing the aborted process of writing the data object" and (iii)' for each "unwritten" data object, successfully writing the data object to peripheral storage device 50. Where only one or more of (i), (ii), and (iii) occur, only the appropriate ones of (i)', (ii)' and (iii)' need be carried out.

In some embodiments, it is desirable to "automatically" restore the outgoing data transfer operation after repairing the peripheral storage device. Thus, this restoring of the outgoing data transfer operation may be carried out automatically in response to a re-coupling of the host device 10 to peripheral storage device 50. This may be useful, for example, to spare the user from the tedious task of re-specifying data object(s) and/or target location(s) upon repair of peripheral storage device 50.

Reference is now made to FIG. 3. Steps S201, S205, S213, S217, S223 and S241 are identical in FIG. 2A and in FIG. 3.

The routine of FIG. 3 adds two additional steps not in the routine of FIG. 2A: steps S211 and S245.

In step S211, before commencing the outgoing data transfer operation, one or more "data transfer operation restoration objects" are saved on the host side, for example, to volatile and/or non-volatile memory. These "data transfer operation restoration objects" will be used later, in step S245, to restore the data transfer operation 245.

The data restoration objects include one or more of: i) a description of one or more identifiers of one or more data objects (for example, file names and/or names of other data objects and/or locations in which the objects reside on the host device, etc) of the data-transfer operation; and ii) peripheral storage device target location data of the inter-device data-transfer operation (for example, directory path data of one or more target paths or other "destination" location information).

These "data restoration objects" may be stored in any location on the host side (optionally but not necessarily on the host device itself), in any combination of volatile and/or non-volatile memory.

During step S245, the data restoration object(s) are used to restore the data transfer operation. For example, the various files or other data objects whose identifiers are saved in step S211 may be (i) retrieved from the host side and (ii) written to target peripheral storage device 50, for example, to one or more target locations saved on the host side in step S211.

Figure 4:
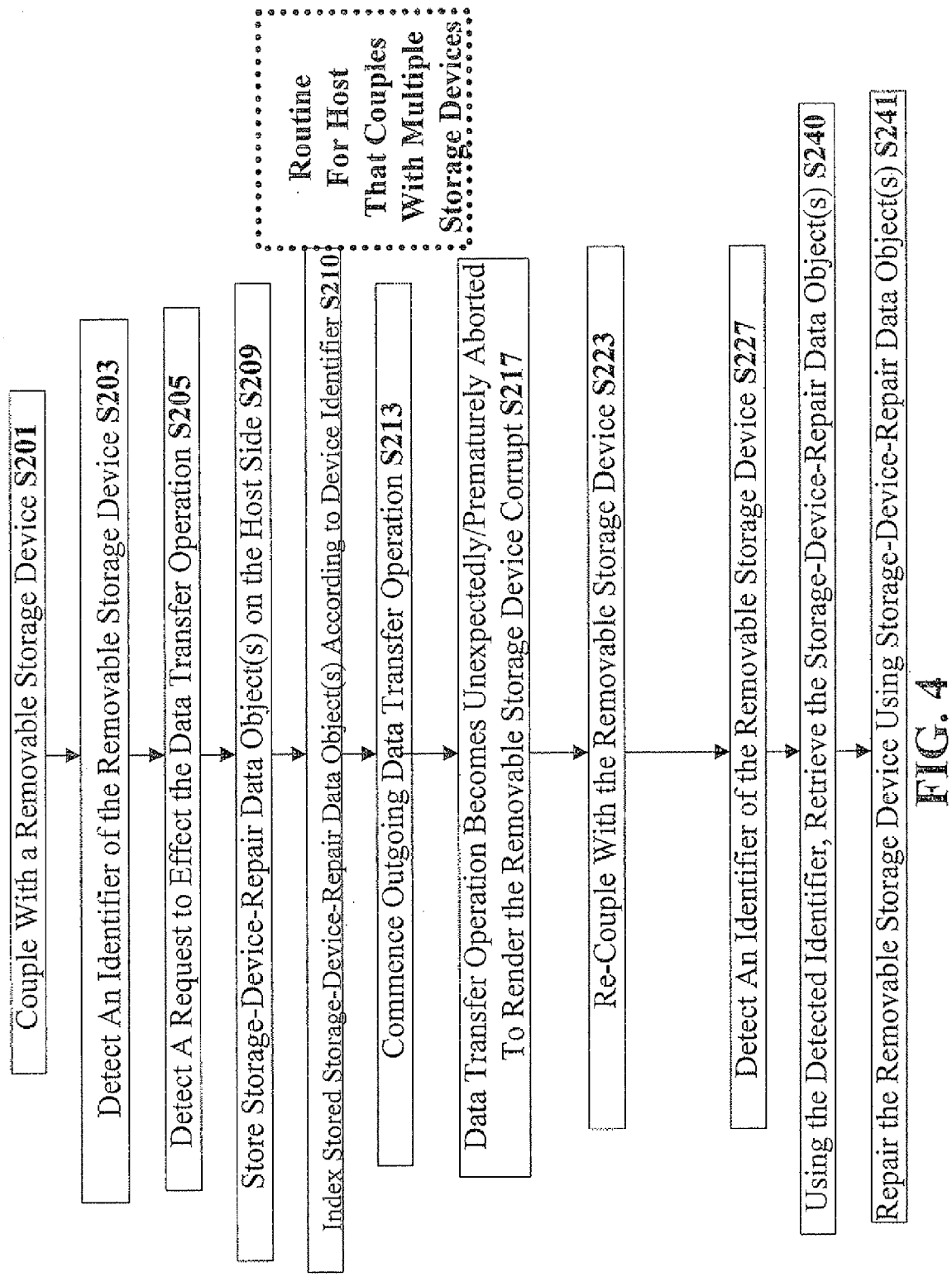

A Discussion of "Restoring" the Data Transfer Operation and of FIG. 4

FIG. 4 relates to the use case where a given host device 10 couples with more than one peripheral storage device 50, and attempts with each peripheral storage device 50 a respective outgoing data-transfer operation which eventually fails and corrupts each peripheral storage device 50.

At a later time, host device 10, in response to a subsequent coupling with one of the peripheral storage device 50 (i.e. that may have participated in multiple failed outgoing data transfer operations), identifies and "remembers" the "particular" peripheral storage device 50 (i.e. without "confusing" the particular peripheral storage device with other peripheral storage devices that participated in other aborted data transfer operations before or after the aborted data transfer operation of the 'particular' storage device) and thus "properly" repairs the subsequently-coupled corrupt peripheral storage using the "correct" recovery data object(s) associated with the specific re-coupled peripheral storage device 50.

Towards this end, it may be advantageous to: (i) store recovery data object(s) for more than one peripheral storage device; (ii) index the recovery data object(s) according to an "identifier" that identifies the peripheral storage device; and (iii) when "re-coupling" with any given corrupted peripheral storage device 50, retrieve the "appropriate" recovery data object(s) (i.e. on the host side) by using the peripheral storage device identifier as an "index" or "key."

Reference is now made to FIG. 4. Steps S201, S205, S209, S213, S217, S223 and S241 are identical in FIG. 2A and in FIG. 4.

The routine of FIG. 4 adds four additional steps: S203, S210, S227, S240.

In step S203, an identifier of peripheral storage device 50 is detected. For example, many UFD devices provide an API where the host may read a "unique electronic serial number" which uniquely identifies the UFD. It is appreciated by those of skill in the art that other implementations are also possible.

In step S209, before the corrupting of the target peripheral storage device 50, the one or more recovery data objects) are stored on the host side (i.e. in recovery data archive 35), and in step S210 the stored one or more recovery data object(s) are indexed according to the device identifier on the host side.

Later, in step S227, after the re-coupling of step S223, the device identifier of the re-coupled peripheral storage device is detected (for example, by invoking the API for accessing a unique device identifier). In step S240, the device identifier (i.e. which is read subsequent to re-coupling) is used to retrieve the previously stored and indexed (i.e. stored in step S209 and indexed in step S210) one or more recovery data object(s) that are specific for the particular re-coupled peripheral storage device 50.

This retrieval (step S240) may be carried out, for example, by seeking a "matching device identifier" (i.e. either an exact match, a best match, an approximate match, or using any other matching technique known in the art) within the indexed data structure, and upon finding the matching device identifier, retrieving the appropriately indexed one or more recovery data object(s) for the peripheral storage device.

It is appreciated that the teachings of indexing of one or more recovery data object(s) according to peripheral device identifier, and the subsequent retrieval of the one or more recovery data object(s) according to the peripheral device identifier (which is detected, once again, after the re-coupling of step S223) may be applied for the purpose of restoring the data transfer operation on a device-specific basis. Thus, these teachings may be applied to the host-side indexing of one or more data transfer operation recovery object(s), and restoration of one or more data transfer operation(s) (step S245, FIG. 3) according to the peripheral device identifier (which is detected, once again, after re-coupling in step S223).

A Discussion Related to "Automatic" Device Repair and/or Restoration vs. User-Triggered Device Repair and/or Restoration In some embodiments, the techniques described in FIGS. 2A, 2B, 3 and 4 may be implemented without requiring any user input or action to repair the peripheral storage device (for example, without requiring any user input or action after device re-coupling in step S223). This could "relieve the user" of the need to have any particular knowledge and/or take any specific action in this regard.

Nevertheless, it is noted that this is not a necessary limitation. In some embodiments, it may desired to solicit user input before and/or during the process of storage device repair and/or restoring the data transfer operation.

In one example, the user may be prompted as to whether or not (s)he wishes to repair the device and/or restore the transaction.

In one example, the device repair and/or data transfer operation restoring may be contingent on receiving a "positive" answer when the user is asked whether or not (s)he wishes to repair the device and/or restore the transaction.

Figure 5A:
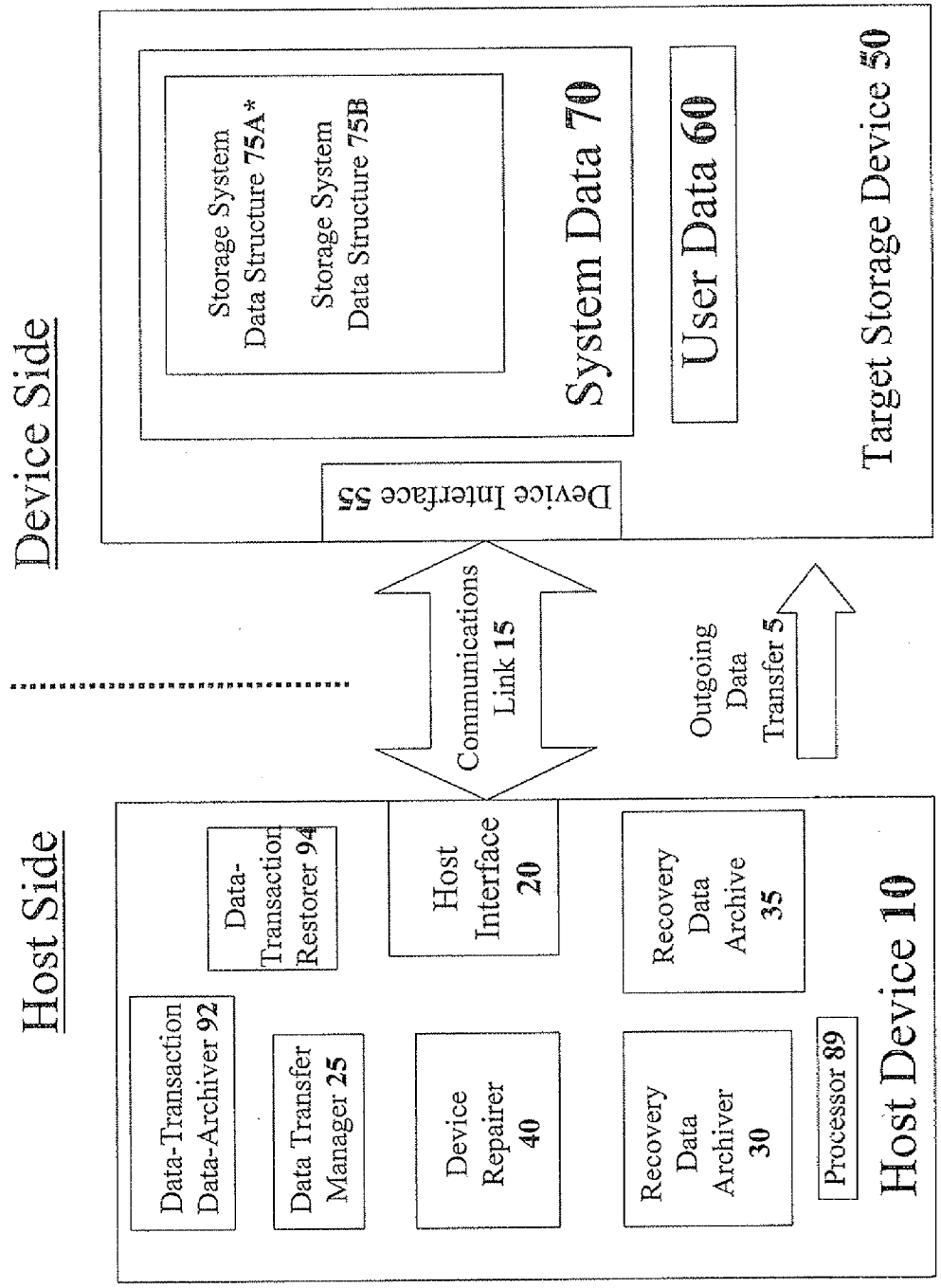
Figure 5B:
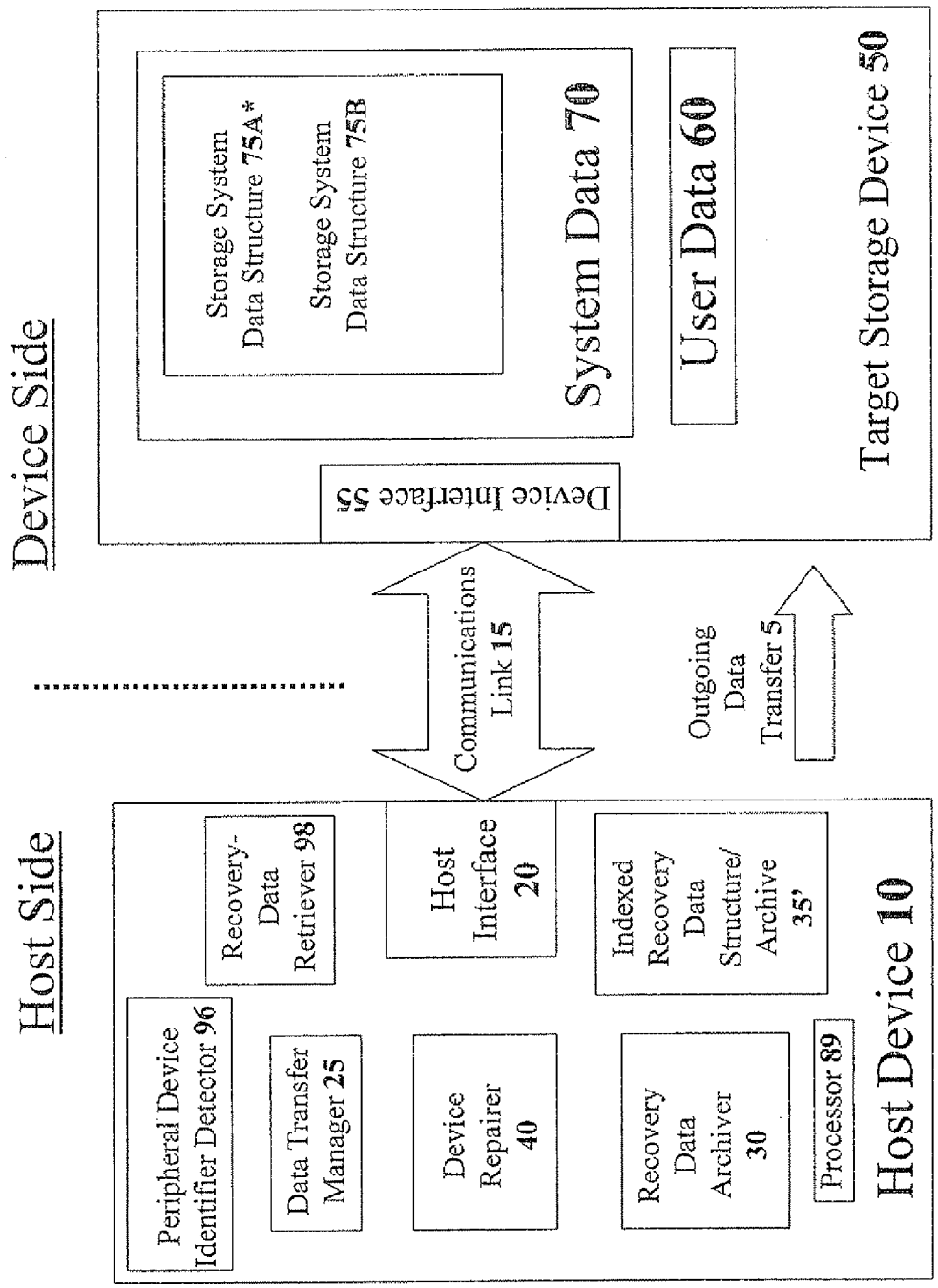
Figure 5C:
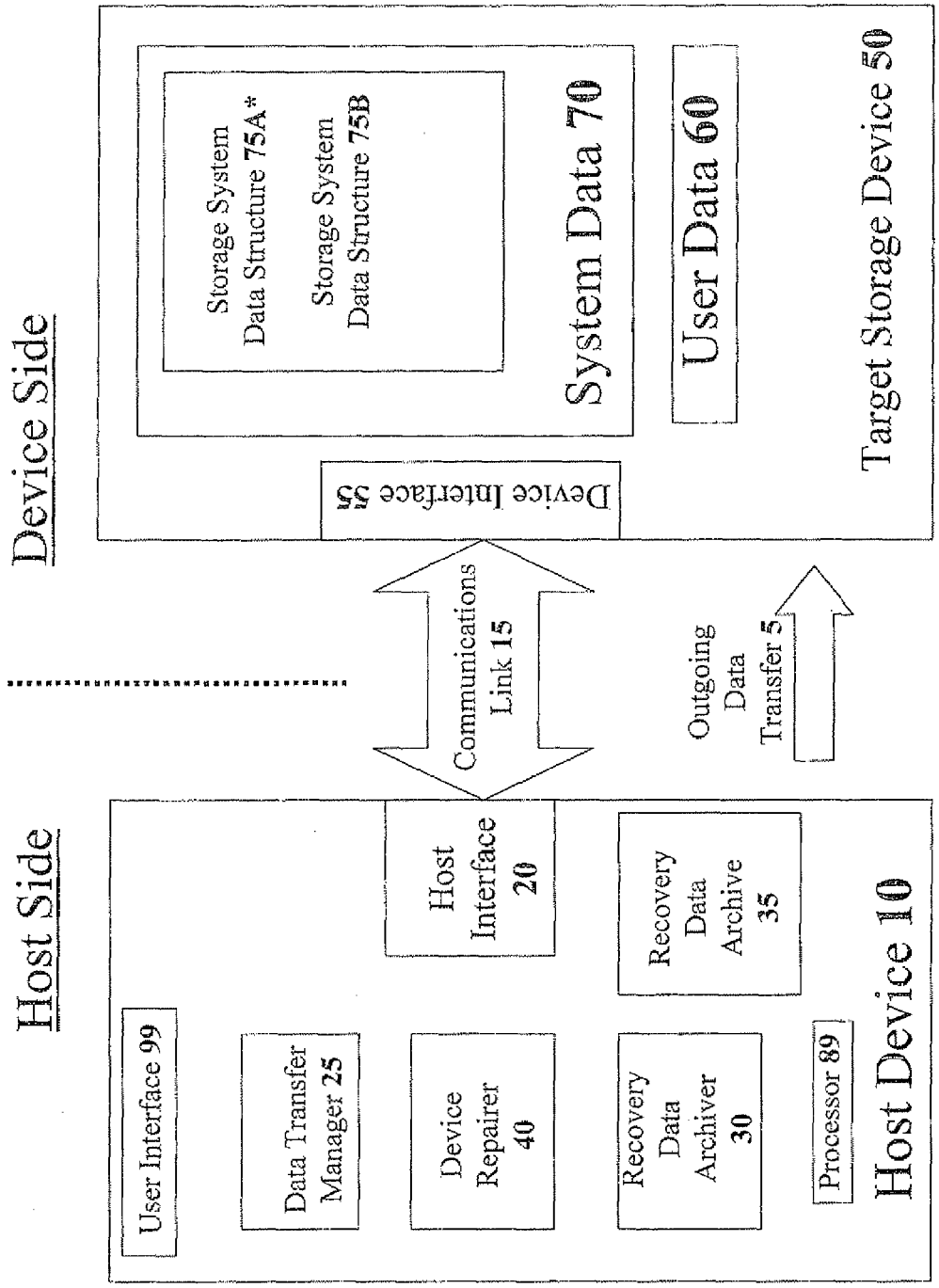

A Discussion of FIGS. 5A-5C

FIGS. 5A-5C are block diagrams of exemplary system configurations according to some example embodiments.

In FIG. 5A, host device 10 includes a data-transaction data-archiver 92 which is operative, prior to the corrupting of the target peripheral storage device by the aborted outgoing inter-device data-transfer operation, and in response to the request to commence the data-transfer operation, to store, on the host side of the device interface, at least one of: i) a description of one or more identifiers of one or more data objects of the data-transfer operation; and ii) peripheral storage device target location data of the inter-device data-transfer operation. Furthermore, in FIG. 5A, host device 10 includes a data-transaction restorer 94 operative i) after the corrupting data-transfer operation; and ii) in response to the subsequent coupling between the host device and the peripheral storage device, to restore the aborted outgoing inter-device data-transfer operation, using i) the description of one or more identifiers of one or more data objects of the data-transfer operation; and/or ii) the peripheral storage device target location data of the inter-device data-transfer operation.

In some embodiments, the system of FIG. 5A is useful for effecting the routine described in FIG. 3.

Reference is now made to FIG. 5B. In the example of FIG. 5B, the recovery data archive 35 includes recovery data for multiple peripheral storage devices 50, and is indexed in accordance with peripheral device identifier. In the example of FIG. 5B, recovery data archive 35 is labeled with the single quote after the number "35", to indicate that the recovery data archive is indexed accordingly.

In FIG. 5B, host device 10 includes peripheral device identifier 96, operative to detect an identifier of the coupled target peripheral device coupled via the device interface, and recovery-data retriever 98 operative, in response to the subsequent coupling between the host device and the peripheral storage device, to retrieve at least one recovery data object specific for the particular target peripheral device associated with the detected identifier, from the host-side indexed recovery data structure, using the identifier of the coupled target peripheral device as an index.

In some embodiments, the system of FIG. 5B is useful for effecting the routine described in FIG. 4.

Reference is now made to FIG. 5C. In FIG. 5S, host device 10 includes a user interface 99. In some embodiments, user interface 99 is operative, in response to the subsequent coupling between the host device and the peripheral storage device, to: A) present, to a user, a request for user approval to repair the corrupted peripheral storage device, and B) receive a response to the presented request. In these embodiments, peripheral device repairer 40 is operative to effect the repairing of the corrupted target peripheral storage device in a manner that is contingent upon receiving a positive response to the presented request.

It is noted that any element appearing in block diagrams 5A-5C, for example, data-transaction data-archiver 92, data-transaction restorer 94, peripheral device identifier 96, recovery-data retriever 98, and user interface 99, may be implemented in any combination of hardware, firmware and/or software. In some embodiments, the software is executable by processor 89.

It is noted that that each of the architectures described in FIGS. 5A-5C is just one possible architecture. For example, in FIG. 5A, data-transaction data-archiver 92 is illustrated as a separate component from recovery data archiver 30. In alternate embodiments, data-transaction data-archiver 92 is a subcomponent of recovery data archiver 30. The skilled artisan will recognize that there are many other variations of this and the other component shown in FIGS. 5A-5C (and FIG. 2B), and that each of the architectures shown in FIGS. 5A-5C (and in FIG. 2B) is provided as one example, and is not intended as limiting. Any of data-transaction data-archiver 92, data-transaction restorer 94, peripheral device identifier 96, recovery-data retriever 98, and user interface 99 may, in alternate embodiments, be provided as subcomponents of any other disclosed element.

Furthermore, it is understood that the combinations of elements residing in host device 10 as described in block diagrams 2B, 5A-5C is not intended as limiting. For example, embodiments that include peripheral device identifier 96 and recovery-data retriever 98 together with data-transaction data-archiver 92 and data-transaction restorer 94 are also contemplated by the present inventors. The skilled artisan will appreciate that any combination of elements is possible.

CONCLUSION

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile storage media such as RAM, ROM, etc. as well as transmission media or signals such as electrical, electromagnetic or digital signals conveyed via a communication medium such as a network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of recovering from an aborted outgoing inter-device data-transfer operation from a host device to a target peripheral storage device which corrupts the target peripheral storage device, the method comprising:

a) prior to the corrupting of the target peripheral storage device and in response to a request to commence the data-transfer operation, storing, on a host side memory, at least one recovery data object indexed in accordance with a peripheral storage identifier and selected from the group consisting of:

i) a redundant copy of a peripheral-device-residing storage-system data structure of the target peripheral storage device, the peripheral-device-residing storage-system data structure is subsequently corrupted by the aborted data-transfer operation; and ii) a handle to a clean location on the peripheral storage device holding the redundant copy of the peripheraldevice-residing storage-system data structure which is not subsequently overwritten by the aborted outgoing data-transfer operation; and b) in response to a subsequent coupling between the host device and the peripheral storage device that occurs after the peripheral-device-residing storage-system data structure is corrupted by the aborted outgoing data-transfer operation, repairing the peripheral-device-residing storage-system data structure of the corrupted target peripheral storage device using said host-side memory stored at least one said recovery data object.

2. The method of claim 1 wherein said peripheral-device-residing storage-system data structure describes a directory tree of the target peripheral storage device.

3. The method of claim 1 wherein said peripheral-device-residing storage-system data structure is a file system table of the target peripheral storage device.

4. The method of claim 1 wherein said peripheral-device-residing storage-system data structure is a flash mapping table of the target peripheral storage device.

5. The method of claim 1 further comprising:
c) prior to the corrupting of the target peripheral storage device by the aborted outgoing inter-device data-transfer operation, and in response to said request to commence the data-transfer operation, storing, on said host side, at least one of:
   i) a description of one or more identifiers of one or more data objects of the data-transfer operation; and
   ii) peripheral storage device target location data of the inter-device data-transfer operation; and
d) after the corrupting data-transfer operation, in response to said subsequent coupling between the host device and the target peripheral storage device, restoring the aborted outgoing inter-device data-transfer operation, using at least one of said description of c(i) and said target location data of c(ii).

6. The method of claim 5 wherein said target location data includes directory path data.

7. The method of claim 1 wherein:
i) said at least one recovery data object is stored in a host-side indexed recovery data structure where a plurality of recovery data objects are indexed in accordance with peripheral storage device identifiers; and
ii) the method further comprises:
   c) after the target peripheral storage device is corrupted by the aborted data-transfer operation,
      i) in response to said subsequent coupling between the host device and the target peripheral storage device, detecting a device identifier of the peripheral storage device; and
      ii) retrieving said at least one recovery data object, of the target device, from said host-side indexed recovery data structure using said detected device identifier of the target peripheral storage device as an index.

8. The method of claim 1 wherein:
i) the method further comprises:
   c) in response to said subsequent coupling between the host device and the target peripheral storage device, soliciting a user approval to repair the corrupted target peripheral storage device, and
ii) wherein said repairing of the corrupted target peripheral storage device of step (b) is contingent upon receiving said user approval in response to said user approval-soliciting.

9. The method of claim 1 wherein said repairing of step (b) is carried out without any user input.

10. A host device comprising:
a) a device interface for coupling with a target peripheral storage device
b) a data-transfer manager for managing inter-device data-transfer operations via said device interface;
c) a recovery-data archiver, operative:
   i) before an aborted outgoing inter-device data-transfer operation:
      A) with a target peripheral storage device that is coupled to said host device via said device interface, and
      B) which subsequently corrupts said coupled target peripheral storage device; and
   ii) in response to a request to commence said outgoing inter-device data-transfer operation, to store in memory, on a host side of said device interface, at least one recovery data object indexed in accordance with a peripheral storage identifier and selected from the group consisting of:
   iii) a redundant copy of a peripheral-device-residing storage-system data structure of the target peripheral storage device, the peripheral-device-residing storage-system data structure is subsequently corrupted by the aborted data-transfer operation; and
   iv) a handle to a clean location on the target peripheral storage device holding the redundant copy of the peripheral-device-residing storage-system data structure which is not subsequently overwritten by the aborted data-transfer operation; and
d) a peripheral device repairer, operative, in response to a subsequent coupling between the host device and the target peripheral storage device that occurs after said peripheral storage device is corrupted by said aborted outgoing data-transfer operation, to repair said corrupted peripheral-device-residing storage-system data structure of said target peripheral storage device using said host-side memory stored at least one said recovery data object.

11. The host device of claim 10 wherein said peripheral-device-residing storage-system data structure describes a directory tree of the target peripheral storage device.

12. The host device of claim 10 wherein said peripheral-device-residing storage-system data structure is a file system table data structure of the target peripheral storage device.

13. The host device of claim 10 wherein said peripheral-device-residing storage-system data structure is a flash management table data structure of the target peripheral storage device.

14. The host device of claim 10 further comprising:
e) a data-transaction data-archiver operative, prior to the corrupting of said target peripheral storage device by said aborted outgoing inter-device data-transfer operation, and in response to said request to commence the data-transfer operation, to store, on said host side of said device interface, at least one of:
   i) a description of one or more identifiers of one or more data objects of the data-transfer operation; and
   ii) peripheral storage device target location data of the inter-device datatransfer operation; and
f) a data-transaction restorer operative:
   i) after the corrupting data-transfer operation; and
   ii) in response to said subsequent coupling between the host device and said target peripheral storage device, to restore said aborted outgoing inter-device data-transfer operation, using said description of e(i) and said target location data of e(ii).

15. The host device of claim 14 wherein said target location data includes directory path data.

16. The host device of claim 10 wherein:
i) the host device further comprises:
e) a peripheral device identifier-detector operative to detect an identifier of said coupled target peripheral storage device coupled via said device interface;
ii) said recovery-data archiver is operative, in accordance with said identifier of said coupled target peripheral storage device received from said peripheral device identifier-detector, to store said at least one recovery data object in a host-side indexed recovery data structure where a plurality of recovery data objects are indexed in accordance with peripheral storage device identifiers; and
iii) the host device further comprises:
f) a recovery-data retriever operative, in response to said subsequent coupling between the host device and the peripheral storage device, to retrieve said at least one recovery data object, for said target peripheral device, from said host-side indexed recovery data structure, using said identifier of said coupled target peripheral storage device as an index.

17. The host device of claim 10:
i) the host device further comprises:
f) a user interface operative, in response to said subsequent coupling between the host device and the peripheral storage device, to:
A) present, to a user, a request for user approval to repair the corrupted target peripheral storage device, and
B) receive a response to said presented request; and
ii) wherein said peripheral device repairer is operative to effect said repairing of said corrupted target peripheral storage device in a manner that is contingent upon receiving a positive said response to said presented request.

18. The host device of claim 10 wherein said peripheral device repairer is operative to effect said repairing of said target peripheral storage device in a manner that is independent of any received user input.

19. A computer readable medium having stored thereon computer readable program code for causing a host computer device to recover from an aborted outgoing inter-device data-transfer operation from the host computer device to a target peripheral storage device which corrupts the target peripheral storage device, the program code being operable to cause the processor to:
a) prior to the corrupting of the target peripheral storage device and in response to a request to commence the data-transfer operation, storing, on a host side, at least one recovery data object indexed in accordance with a peripheral storage identifier and selected from the group consisting of:
i) a redundant copy of a peripheral-device-residing storage-system data structure of the target peripheral storage device, the peripheral-device-residing storage-system data structure is subsequently corrupted by the aborted data-transfer operation; and
ii) a handle to a clean location on the target peripheral storage device holding the redundant copy of the peripheral-device-residing storage-system data structure which is not subsequently overwritten by the aborted outgoing data-transfer operation; and
b) in response to a subsequent coupling between the host device and the target peripheral storage device that occurs after the target peripheral storage device is corrupted by the aborted outgoing data-transfer operation, repairing the corrupted target peripheral storage device using said host-side stored at least one said recovery data object.

20. The computer readable medium of claim 19 wherein said peripheral-device-residing storage-system data structure describes a directory tree of the target peripheral storage device.

21. The computer readable medium of claim 19 wherein said peripheral-device-residing storage-system data structure is a file system table of the target peripheral storage device.

22. The computer readable medium of claim 19 wherein said peripheral-device-residing storage-system data structure is a flash mapping table of the target peripheral storage device.

23. The computer readable medium of claim 19 wherein the program code is further operable to cause the processor to:
c) prior to the corrupting of the target peripheral storage device by the aborted outgoing inter-device data-transfer operation, and in response to said request to commence the data-transfer operation, storing, on said host side, at least one of:
i) a description of one or more identifiers of one or more data objects of the data-transfer operation; and
ii) peripheral storage device target location data of the inter-device data-transfer operation; and
d) after the corrupting data-transfer operation, in response to said subsequent coupling between the host device and the target peripheral storage device, restoring the aborted outgoing inter-device data-transfer operation, using at least one of said description of c(i) and said target location data of c(ii).

24. The computer readable medium of claim 23 wherein said target location data includes directory path data.

25. The computer readable medium of claim 19 wherein:
i) the program code is operable such that said at least one recovery data object is stored in a host-side indexed recovery data structure where a plurality of recovery data objects are indexed in accordance with peripheral storage device identifiers; and
ii) the program code is further operable to cause the processor to:
c) after the target peripheral storage device is corrupted by the aborted data-transfer operation,
i) in response to said subsequent coupling between the host device and the target peripheral storage device, detecting a device identifier of the target peripheral storage device; and
ii) retrieving said at least one recovery data object, of the target peripheral storage device, from said host-side indexed recovery data structure using said detected device identifier of the target peripheral storage device as an index.

26. The computer readable medium of claim 19 wherein:
i) the program code is further operable to cause the processor to:
- c) in response to said subsequent coupling between the host device and the target peripheral storage device, soliciting a user approval to repair the corrupted peripheral storage device, and ii) wherein the program code is operable such that said repairing of the corrupted target peripheral storage device of step (b) is contingent upon receiving said user approval in response to said user approval-soliciting.

27. The computer readable medium of claim 19 wherein the program code is operable such that, upon execution by the processor, said repairing of step (b) is carried out without any user input.

* * * * *